(12) United States Patent
Aoyama et al.

(10) Patent No.: US 9,355,657 B1
(45) Date of Patent: May 31, 2016

(54) IMPLEMENTING SPIN TORQUE OSCILLATOR ERASURE PREVENTION IN MICROWAVE-ASSISTED MAGNETIC RECORDING (MAMR) HARD DISK DRIVES

(71) Applicant: HGST Netherlands B.V., Amsterdam (NL)

(72) Inventors: Jun Aoyama, Kanagawa (JP); Masato Shiimoto, Hiratsuka (JP)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/731,832

(22) Filed: Jun. 5, 2015

(51) Int. Cl.
  *G11B 5/31* (2006.01)
  *G11B 5/127* (2006.01)

(52) U.S. Cl.
  CPC ............ *G11B 5/3133* (2013.01); *G11B 5/1278* (2013.01)

(58) Field of Classification Search
  CPC .............................. G11B 5/1278; G11B 5/3133
  USPC ............................................ 360/125.3, 324.2
  See application file for complete search history.

(56) References Cited

U.S. PATENT DOCUMENTS

| | | | |
|---|---|---|---|
| 8,305,711 B2 | 11/2012 | Li et al. | |
| 8,547,656 B2 | 10/2013 | Igarashi et al. | |
| 8,553,507 B1 | 10/2013 | Tagawa et al. | |
| 8,570,684 B1 | 10/2013 | Contreras et al. | |
| 8,582,240 B1 * | 11/2013 | Chen | G11B 5/399 360/125.3 |
| 8,625,235 B2 | 1/2014 | Takano et al. | |
| 8,724,262 B1 | 5/2014 | Koui | |
| 2010/0032777 A1 * | 2/2010 | Gao | B82Y 25/00 257/421 |
| 2011/0194341 A1 * | 8/2011 | Gaidis | H01L 27/24 365/171 |
| 2014/0063922 A1 * | 3/2014 | Kim | G11C 8/08 365/158 |
| 2014/0085753 A1 | 3/2014 | Nagasaka et al. | |
| 2014/0118861 A1 | 5/2014 | Funayama | |
| 2014/0145792 A1 * | 5/2014 | Wang | H01F 10/3272 331/94.1 |
| 2014/0217487 A1 * | 8/2014 | Guo | H01L 43/12 257/295 |
| 2014/0347969 A1 * | 11/2014 | Nishida | G11B 5/6076 369/53.38 |
| 2015/0131184 A1 * | 5/2015 | Nunokawa | G11B 5/3116 360/236.8 |
| 2015/0137286 A1 * | 5/2015 | Guo | H01L 43/12 257/421 |

* cited by examiner

*Primary Examiner* — Jefferson Evans
(74) *Attorney, Agent, or Firm* — Joan Pennington

(57) ABSTRACT

A method, apparatus, and system are provided for implementing spin-torque oscillator (STO) erasure prevention for microwave assisted magnetic recording (MAMR) hard disk drives (HDDs). A first voltage is applied to an STO element in the MAMR head at the time of write operation. A second voltage is applied to the STO element at the time of read operation, or not write operation, to prevent STO erasure otherwise resulting from remnant magnetization of STO at the time of read operation.

11 Claims, 12 Drawing Sheets

600

| | TG FIELD 602 | STO CURRENT 604 | STO FIELD 606 | FGL FREQ 608 |
|---|---|---|---|---|
| WRITE W/ STO BIAS | 12 kOe | -3 mA | 0.6 kOe | 15 GHz |
| RE W/O STO BIAS | 0 kOe | 0 mA | 1.0 kOe | ~0 GHz |
| READ W/STO BIAS | 0 kOe | -3 mA | 0.6 kOe | ~0 GHz |
| READ W/ STO BIAS | 0 kOe | +1 mA | 0.3 kOe | ~0 GHz |

FIG. 6

IMPLEMENTING SPIN TORQUE OSCILLATOR ERASURE PREVENTION IN MICROWAVE-ASSISTED MAGNETIC RECORDING (MAMR) HARD DISK DRIVES

FIELD OF THE INVENTION

The present invention relates generally to the data storage field, and more particularly, relates to a method, apparatus, and system for implementing spin-torque oscillator (STO) erasure prevention in microwave assisted magnetic recording (MAMR) hard disk drives (HDDs).

DESCRIPTION OF THE RELATED ART

Many data processing applications require long-term data storage and typically a high-degree of data integrity. Typically these needs are met by non-volatile data storage devices. Non-volatile storage or persistent media can be provided by a variety of devices, most commonly, by direct access storage devices (DASDs), which also are referred to as hard disk drives (HDDs).

Microwave Assisted Magnetic Recording (MAMR) uses a Spin Torque Oscillator (STO) to generate localized microwave radiation around the pole tip to improve the magnetic recording process. Using MAMR, magnetic media with high coercivity can be used to increase the bit density A need exists for an effective mechanism for prevention of spin-torque oscillator (STO) erasure in microwave assisted magnetic recording (MAMR) hard disk drives (HDDs).

SUMMARY OF THE INVENTION

Aspects of the preferred embodiments are to provide a method, apparatus, and system for implementing spin-torque oscillator (STO) erasure prevention. Other important aspects of the preferred embodiments are to provide such method, apparatus, and system substantially without negative effect and to overcome some of the disadvantages of prior art arrangements.

In brief, a method, apparatus, and system are provided for implementing spin-torque oscillator (STO) erasure prevention for microwave assisted magnetic recording (MAMR) hard disk drives (HDDs). A first voltage is applied to an STO element in the MAMR head at the time of write operation. A second voltage is applied to the STO element at the time of read operation, or not write operation, to prevent STO erasure otherwise resulting from remnant magnetization of STO at the time of read operation.

BRIEF DESCRIPTION OF THE DRAWINGS

The present invention together with the above and other objects and advantages may best be understood from the following detailed description of the preferred embodiments of the invention illustrated in the drawings, wherein:

FIG. 6 is a chart illustrating example STO operation with respect to write and read operations with and without STO bias in accordance with preferred embodiments;

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the preferred embodiments, a method, apparatus, and system are provided for implementing spin-torque oscillator (STO) erasure prevention for microwave assisted magnetic recording (MAMR) hard disk drives (HDDs).

Figure 1:
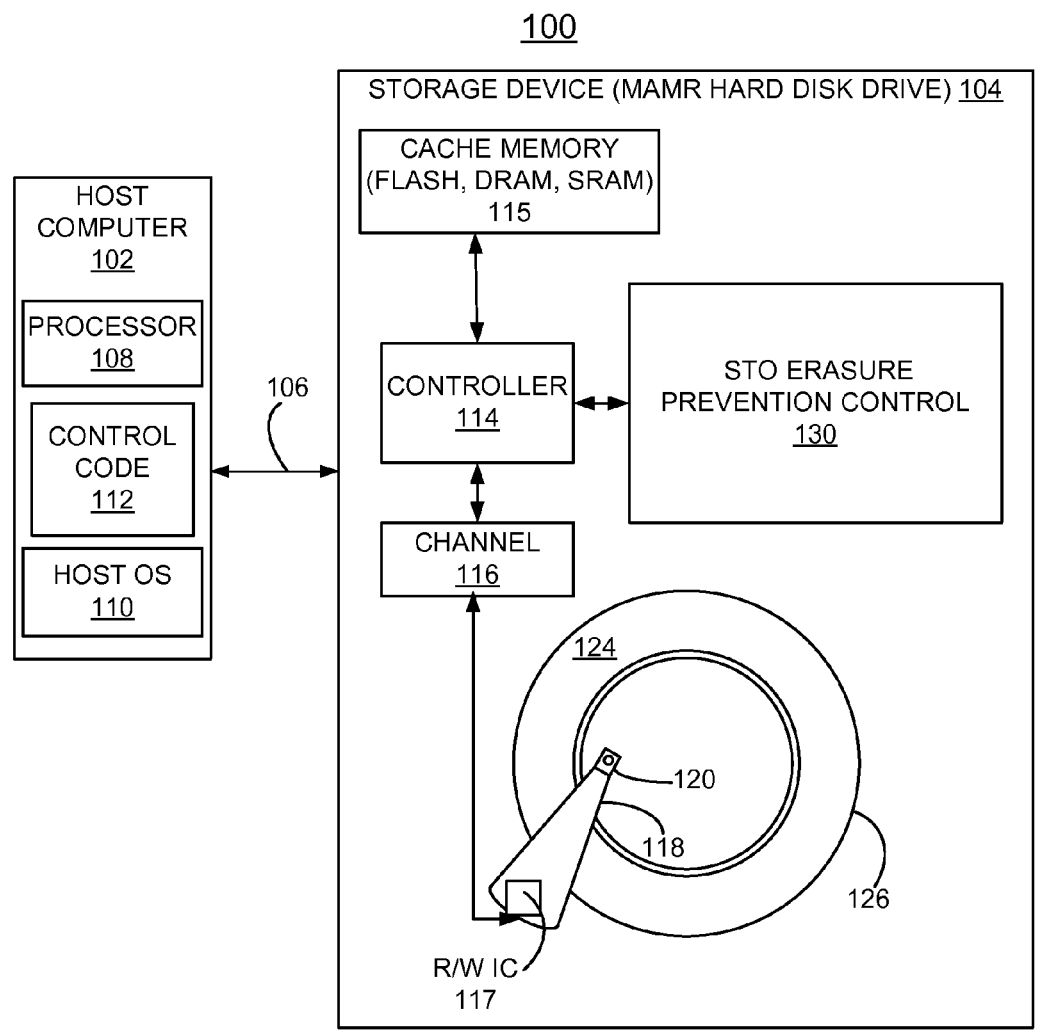
FIG. 1 is a block diagram representation illustrating a system for implementing spin-torque oscillator (STO) erasure prevention for microwave assisted magnetic recording (MAMR) hard disk drives (HDDs) in accordance with preferred embodiments.

Having reference now to the drawings, in FIG. 1, there is shown an example system generally designated by the reference character 100 for implementing spin-torque oscillator (STO) erasure prevention for microwave assisted magnetic recording (MAMR) hard disk drives (HDDs) in accordance with preferred embodiments. System 100 includes a host computer 102, a storage device 104, such as a hard disk drive (HDD) 104, and an interface 106 between the host computer 102 and the storage device 104.

As shown in FIG. 1, host computer 102 includes a processor 108, a host operating system 110, and control code 112. The storage device or microwave assisted magnetic recording (MAMR) hard disk drive 104 includes a controller 114 coupled to a cache memory 115, for example, implemented with one or a combination of a flash memory, a dynamic random access memory (DRAM) and a static random access memory (SRAM), and coupled to a data channel 116. The storage device or hard disk drive 104 includes a Read/Write (R/W) integrated circuit (IC) 117 implementing spin-torque oscillator (STO) erasure prevention of the preferred embodiments. The storage device or hard disk drive 104 includes an arm 118 carrying a slider 120 for in accordance with preferred embodiments. The slider 120 flies over a writable disk surface 124 of a disk 126 and includes at least one STO for microwave assisted magnetic recording (MAMR), for example, integrated with the slider 120.

In accordance with features of preferred embodiments, an STO erasure prevention control 130 for spin-torque oscillator (STO) erasure prevention is provided with the controller 114.

System 100 including the host computer 102 and the MAMR HDD 104 is shown in simplified form sufficient for understanding the present embodiments. The illustrated host computer 102 together with the storage device or HDD 104 is not intended to imply architectural or functional limitations.

The preferred embodiments for spin-torque oscillator (STO) erasure prevention can be used with various hardware implementations and systems and various other internal hardware devices. While the control code 112 is shown in the host computer 102, and the controller 114 is shown in the hard disk drive 104, the control code 112 may reside in any suitable location, such as the hard disk drive 104 separate from host computer 102 and controller circuit 114 may reside in any suitable location, separate from hard disk drive 104, for example, in the host computer 102, and the like.

Figure 2A:
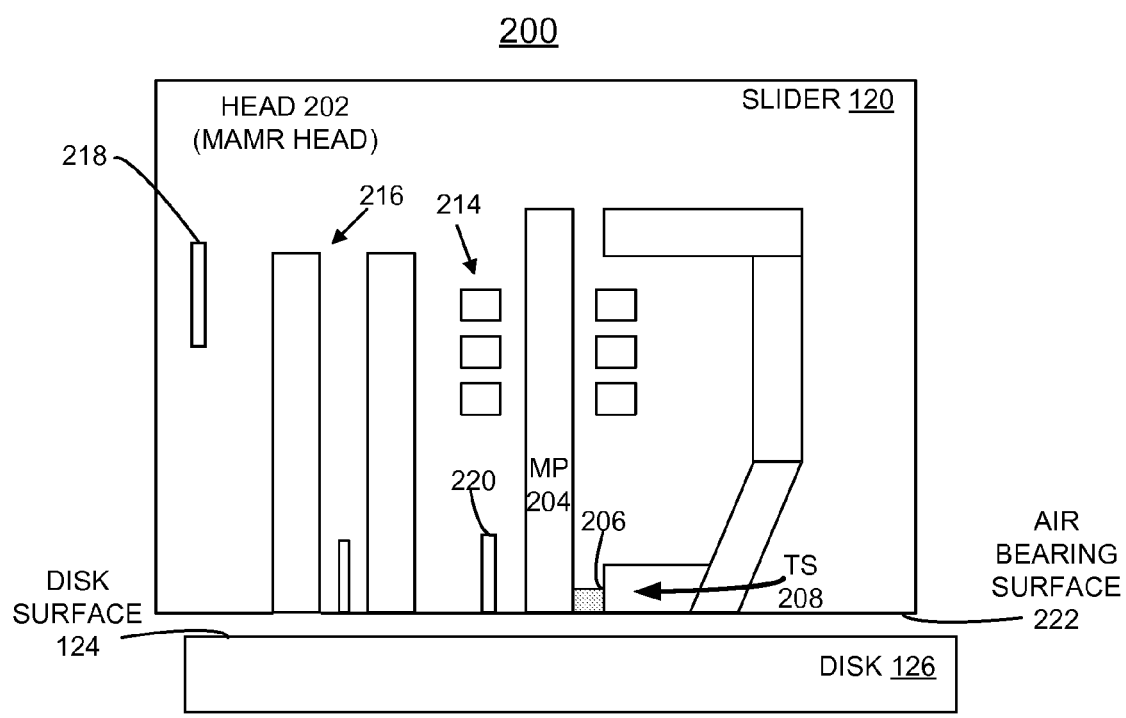
FIG. 2A illustrates example apparatus for spin-torque oscillator (STO) erasure prevention for microwave assisted magnetic recording (MAMR) hard disk drives (HDDs) in accordance with preferred embodiments.

Referring now FIG. 2A, there are shown example slider, head, and disk apparatus generally designated by the reference character 200 for implementing spin-torque oscillator (STO) erasure prevention for microwave assisted magnetic recording (MAMR) hard disk drives (HDDs) of the preferred embodiments. Apparatus 200 includes a recording head 202, such as a MAMR head 202 provided with the slider 120. The MAMR head 202 includes a main magnetic pole (MP) 204, a spin-torque oscillator (STO) 206, and a trailing shield 208 of the head writer. As shown, the MAMR head 202 includes a coil 214 positioned proximate the main magnetic pole MP 204, a reader 216, and a thermal flying height control 218. The HAMR head 202 optionally includes an embedded contact sensor (ECS) 220 proximate the air bearing surface 222 of the MAMR head 202.

Figure 2B:
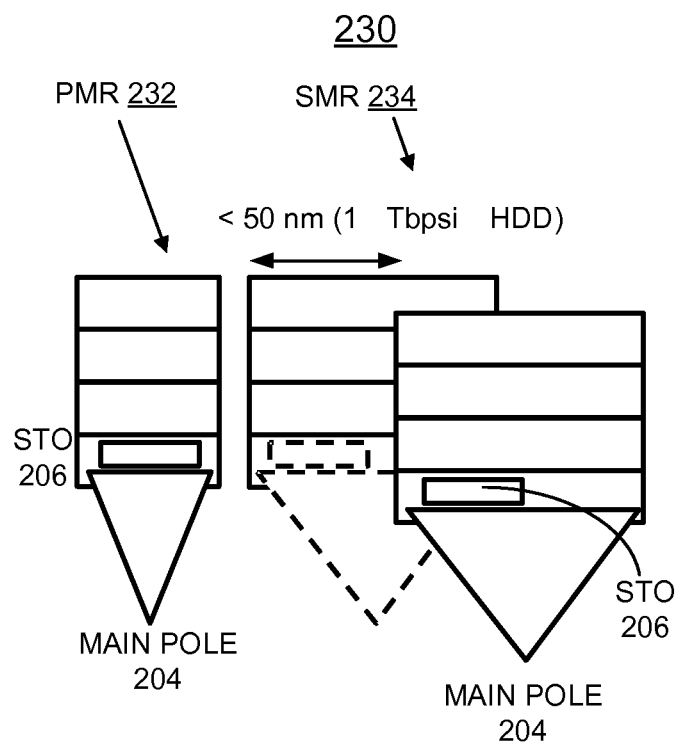
FIGS. 2B and 2C illustrate example spin-torque oscillator (STO) aspect ratio and operation for microwave assisted magnetic recording (MAMR) hard disk drives (HDDs)
Figure 2C:
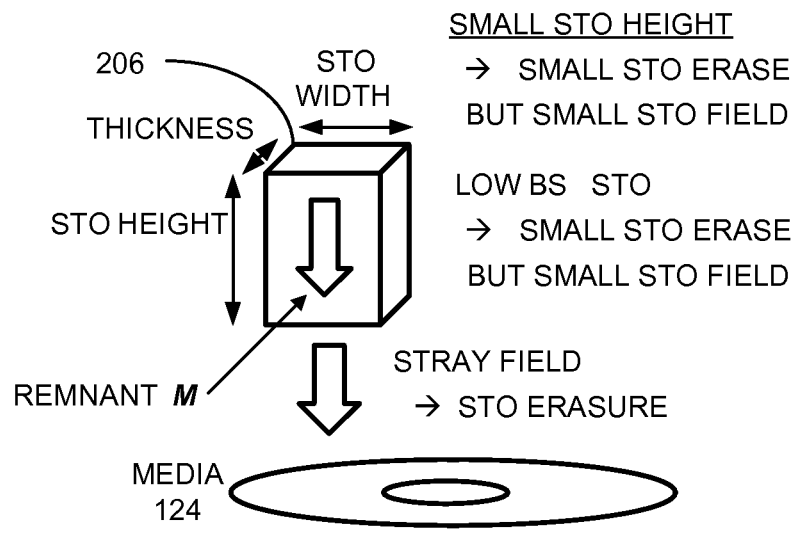

Referring now to FIGS. 2B and 2C, there are shown example spin-torque oscillator (STO) operations and aspect ratio respectively generally designated by the reference characters 230, 250 for microwave assisted magnetic recording (MAMR) hard disk drives (HDDs).

Referring now FIG. 2B, there are shown example spin-torque oscillator (STO) operations 230 with the STO 206 and main pole 204 illustrating Perpendicular Magnetic Recording (PMR) 232 and Shingled Magnetic Recording (SMR) 234, where successively written data tracks partially overlap.

Referring now to FIG. 2C, there are shown example spin-torque oscillator (STO) operations and example aspect ratio respectively 250 for microwave assisted magnetic recording (MAMR) hard disk drives (HDDs). The example STO 206 is shown with an STO THICKNESS, an STO WIDTH and an STO HEIGHT. The example STO 206 illustrates that there is a high possibility that the erasure resulting from the remnant magnetization M of STO in the time of read operation with STO erasure that actualizes as the track density becomes high, for example, where the data track width and the STO WIDTH become narrow. The magnetic domain control depending on optimization of the aspect ratio of STO, selection of low Magnetic Flux Density (Bs) material, or multi-layer structure to make closed domain trades off microwave assisting effects.

Figure 3A:
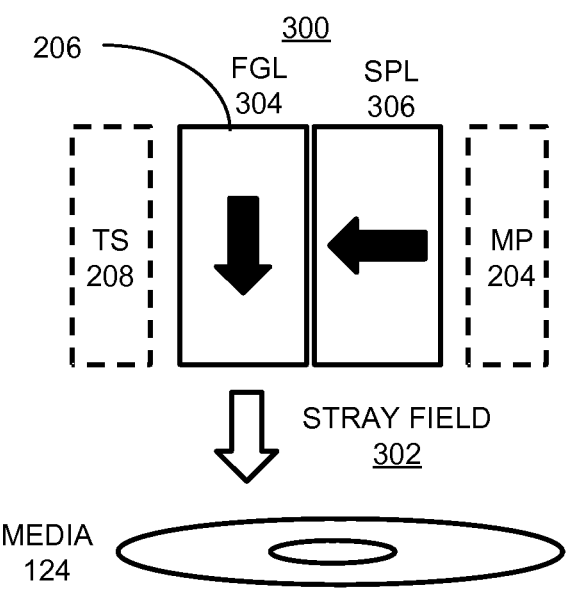
FIGS. 3A and 3B respectively illustrate example operations of an STO with voltage not applied to the STO and voltage applied to the STO at the time of read operation in accordance with preferred embodiments.
Figure 3B:
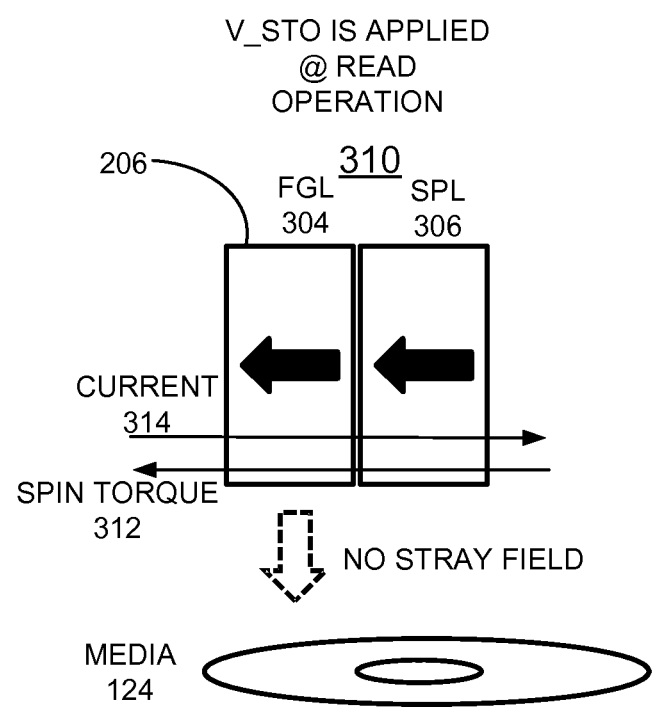

FIGS. 3A and 3B respectively illustrate example operations respectively generally designated by the reference characters 300, 310 of an STO with voltage not applied to the STO and voltage applied to the STO at the time of read operation in accordance with preferred embodiments. As shown, STO 206 includes a field generation layer (FGL) 304 and a spin polarization layer (SPL) 306 relative to a disk media 124, and located between a main pole (MP) 204 and trailing shield (TS) 208 in FIG. 3A. In FIG. 3A, there is shown conventional operation 300 of an STO with voltage not applied to the STO at the time of read operation with a stray field 302 applied to the disk media 124. In FIG. 3B, there is shown STO operation 310 of the STO 206 with voltage applied to the STO at the time of read operation in accordance with preferred embodiments. STO operation 310 illustrates spin torque 312 and current 314 in opposite directions with minimized stray field or no stray field (removed by the V_STO used). The direction of the magnetization in FGL 304 is changed by the effect of spin torque and current 314 in opposite direction.

Figure 4:
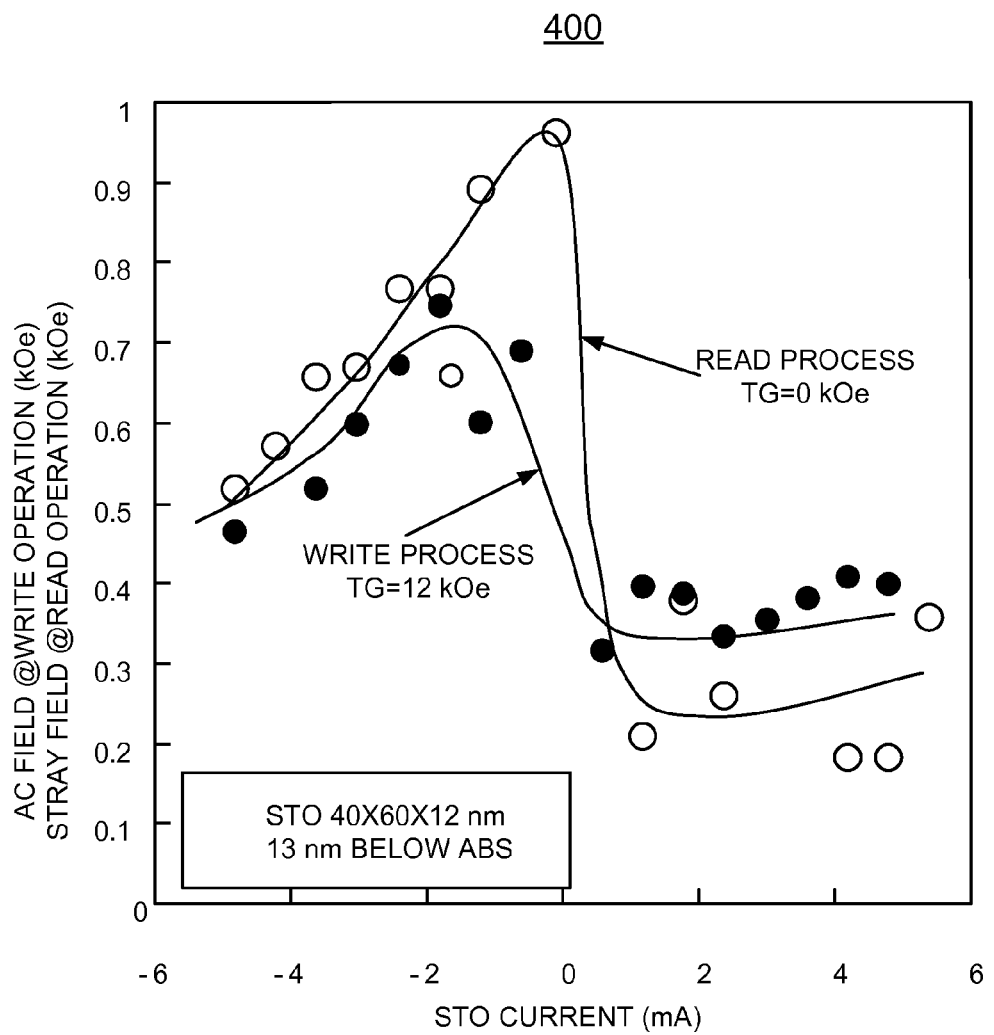
FIGS. 4 and 5 respectively illustrate example waveforms of example AC field strength and higher field generation layer (FGL) with respect to STO current in accordance with preferred embodiments.
Figure 5:
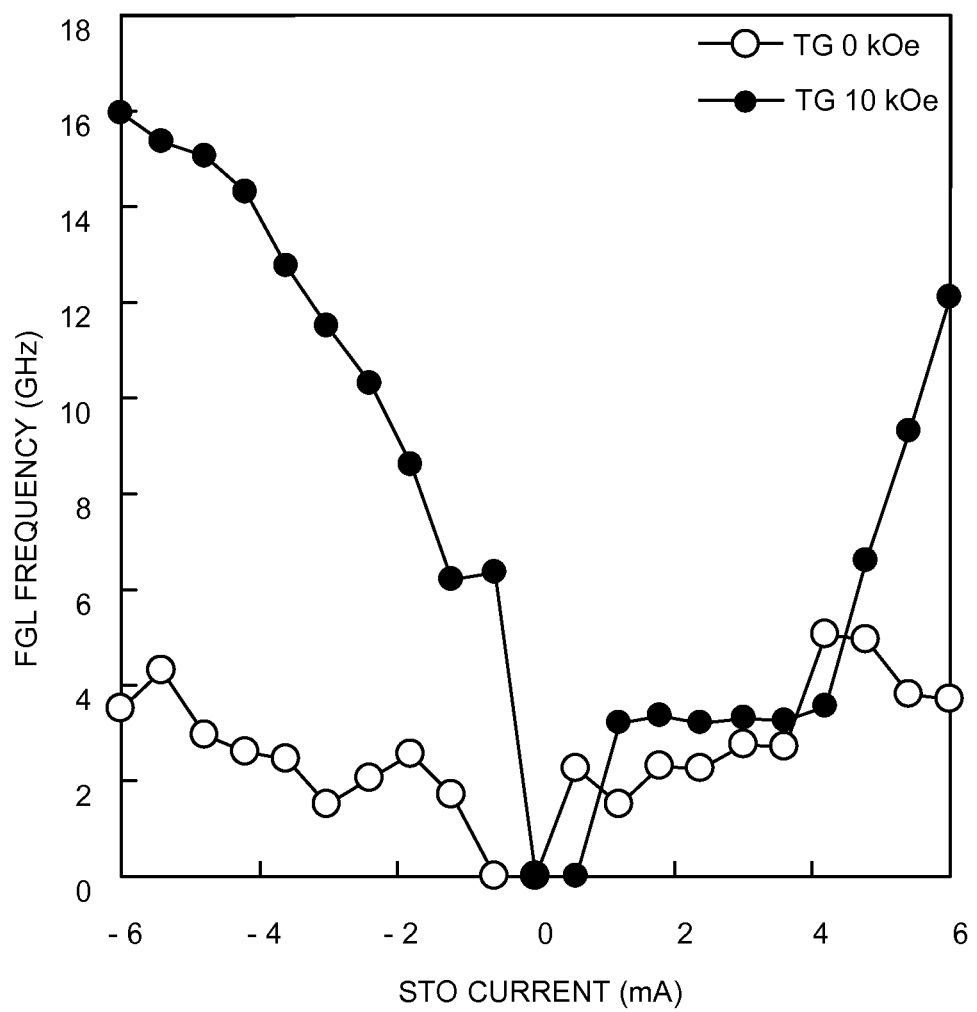

FIGS. 4 and 5 respectively illustrate example waveforms respectively generally designated by the reference characters 400, 500 in accordance with preferred embodiments of example AC field strength and higher field generation layer (FGL) with respect to STO current shown relative to the horizontal axis. In FIG. 4, waveforms 400 confirm reduction of stray field strength with STO current (positive). Reduction effect shows up with lower current density as compared to the current density in the write operation (about −3 mA). In FIG. 5, waveforms 500 confirm higher frequency of STO field with STO current (negative) in the write operation. On the other hand, in the read operation when TG field is zero, precession frequency of the field generation layer (FGL) is quite small.

Referring to FIG. 6, there is shown a chart illustrating example STO operation generally designated by the reference character 600 with respect to write and read operation with and without STO bias in accordance with preferred embodiments. For each of write with STO bias, read without STO bias, read with STO bias, and read with another STO bias, trailing gap (TG) field 602, STO current 604, STO field 606, and FGL frequency 608 are shown. The trailing gap (TG) field 602 represents the field from the main pole 204 to the FGL layer of the STO. As shown, the TG field 602 and FLG frequency 608 are non-zero values with the write with STO bias. The read with STO bias providing a STO current in the opposite direction to the STO current for the write with STO bias provides the lowest STO field, for STO erasure prevention in accordance with features of the preferred embodiments.

Figure 7:
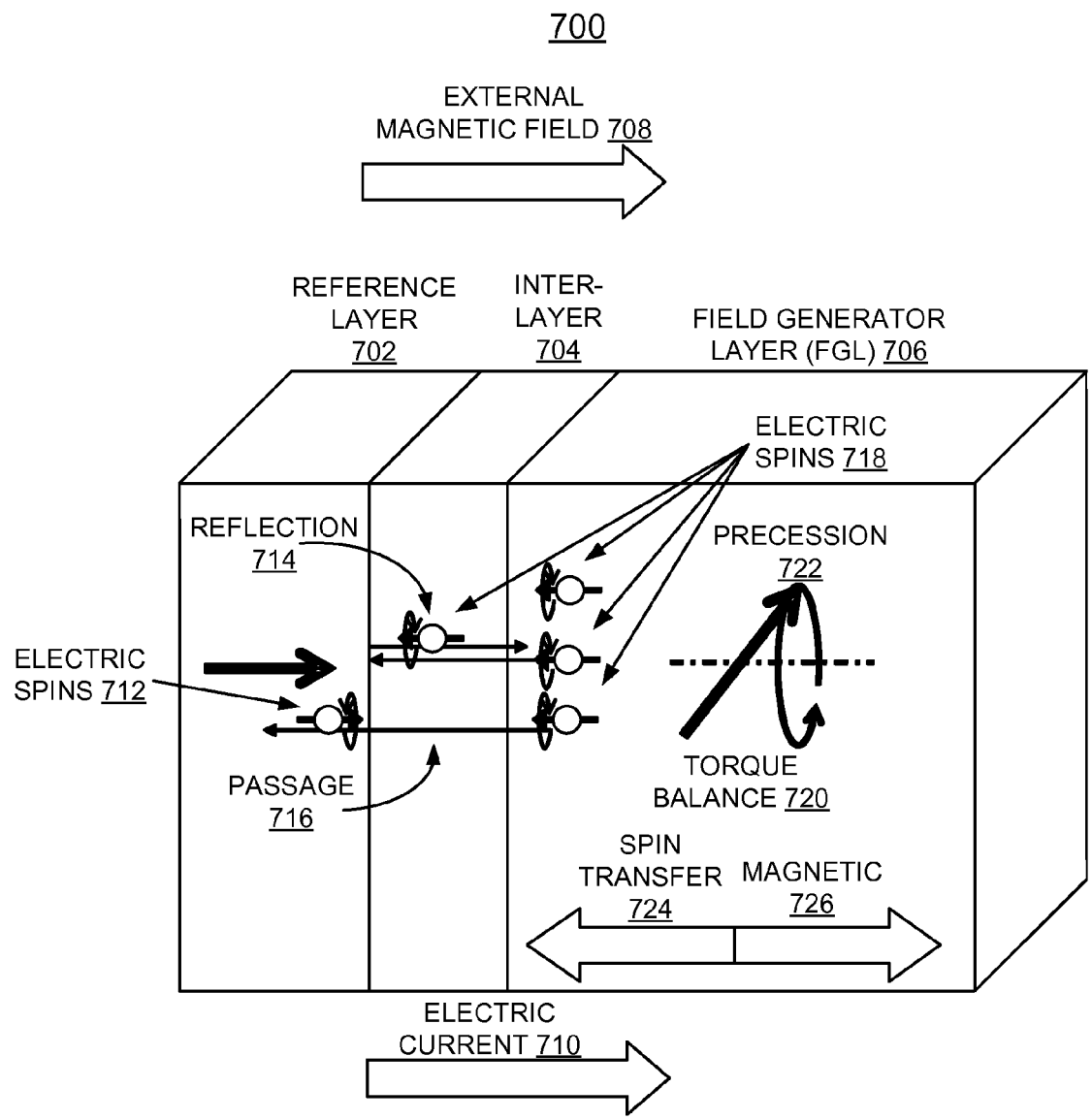
FIG. 7 schematically illustrates example STO operation with respect to write and read operation with and without STO bias in accordance with preferred embodiments.

Referring now to FIG. 7, there is schematically illustrated example STO structure generally designated by the reference character 700 in accordance with preferred embodiments. STO 700 includes a reference layer 702, an interlayer 704 and a field generation layer (FGL) 706. As indicated by arrows, an external magnetic field 708 is generated responsive to an electric current 710 flowing from the reference layer 702 via the interlayer 704 to the field generation layer 706. As shown, electric spins 712 are generated in the reference layer 702 with electric spin reflection 714 and passage 716 through interlayer 704 with electric spins 718 generated in the field generation layer (FGL) 706. Due to spin transfer torque 720, magnetization procession 722 is amplified in the field generation layer (FGL) 706 with spin transfer 724 and magnetic field 726, as indicated by arrows in opposite directions.

Figure 8:
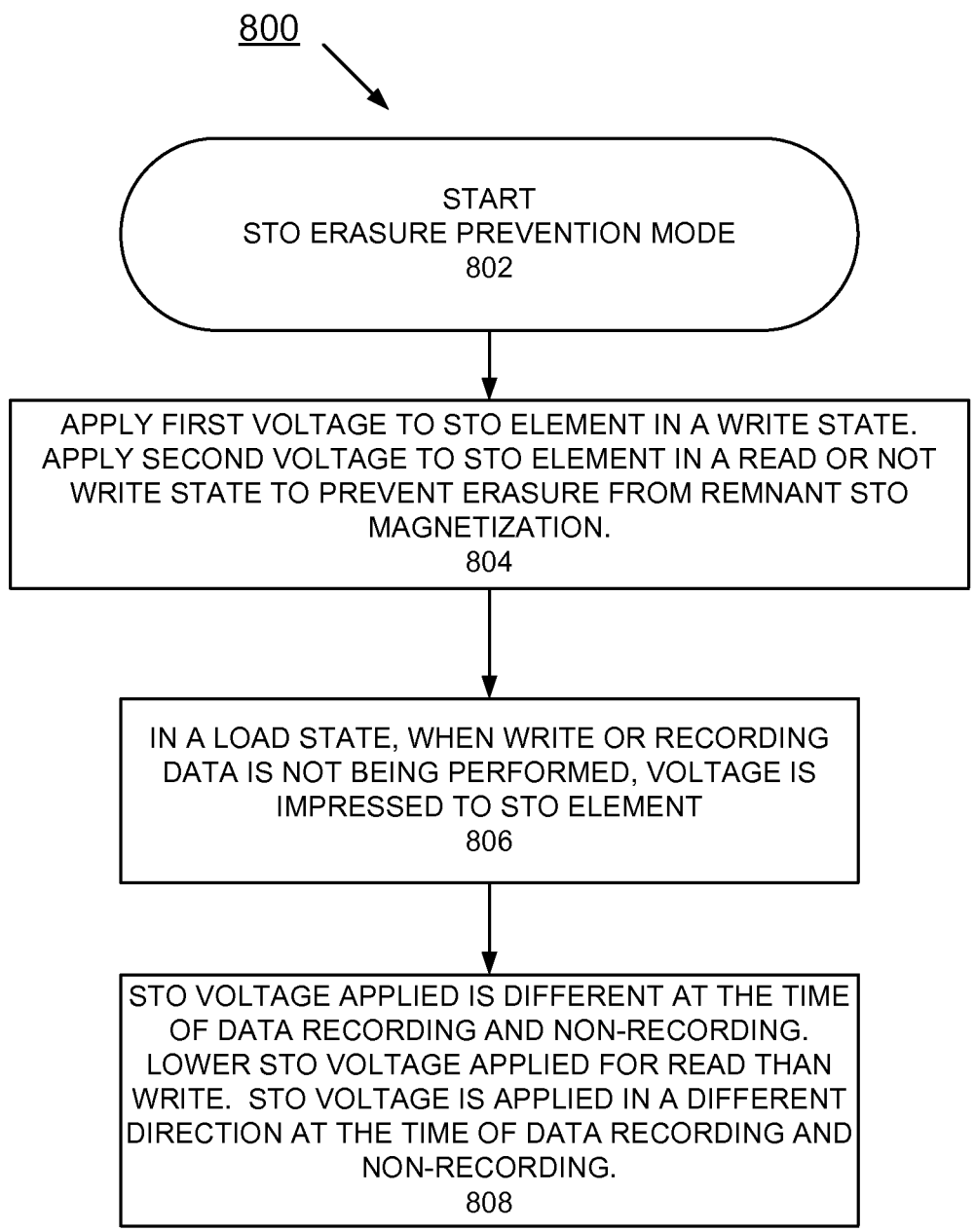
FIG. 8 is a flow chart illustrating example operations for implementing spin-torque oscillator (STO) erasure prevention in MAMR HDDs in accordance with preferred embodiments.

Referring now to FIG. 8 there is shown a flow chart illustrating example operations generally designated by the reference character 800 for implementing spin-torque oscillator (STO) erasure prevention in MAMR HDDs in accordance with preferred embodiments starting at a block 802. As indicated in a block 804, a first voltage is applied to an STO element in the MAMR head at the time of write operation, and a second voltage is applied to the STO element at the time of read operation, or not write operation, to prevent STO erasure otherwise resulting from remnant magnetization of STO at the time of read operation. As indicated in a block 806, when write or recording data is not being performed, voltage is impressed to the STO element. As indicated in a block 808, the STO voltage applied is different at the time of data recording (write) and non-recording (read). At block 808, a lower STO voltage is applied at the time of non-recording (read) than data recording (write). At block 808, the STO voltage is applied in a different direction at the time of data recording (write) and non-recording (read).

Figure 9:
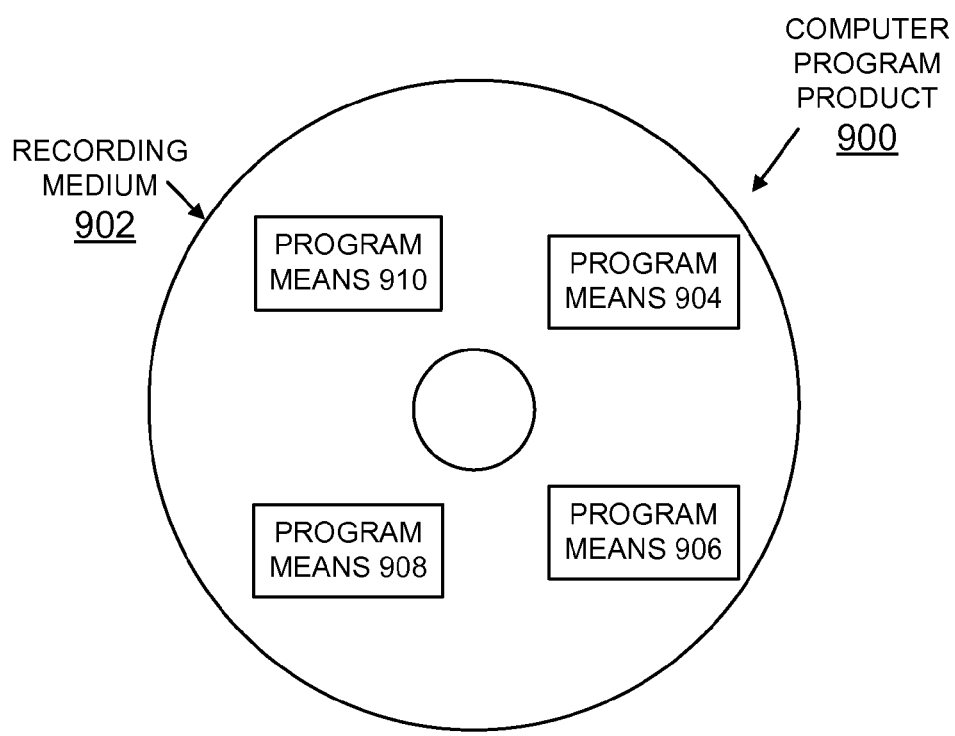
FIG. 9 is a block diagram illustrating a computer program product in accordance with preferred embodiments.

Referring now to FIG. 9, an article of manufacture or a computer program product 900 of the preferred embodiments is illustrated. The computer program product 900 includes a computer readable recording medium 902, such as, a floppy disk, a high capacity read only memory in the form of an optically read compact disk or CD-ROM, a tape, or another similar computer program product. Computer readable recording medium 902 stores program means or control code 904, 906, 908, 910 on the medium 902 for carrying out the methods for implementing spin-torque oscillator (STO) erasure prevention for MAMR hard disk drives in accordance with preferred embodiments in the system 100 of FIG. 1.

A sequence of program instructions or a logical assembly of one or more interrelated modules defined by the recorded program means or control code 904, 906, 908, 910, direct HDD controller 114 during MAMR HDD operation of preferred embodiments for carrying out the methods for implementing spin-torque oscillator (STO) erasure prevention for MAMR hard disk drives in accordance with preferred embodiments in the system 100 of FIG. 1.

While the present invention has been described with reference to the details of the embodiments of the invention shown in the drawing, these details are not intended to limit the scope of the invention as claimed in the appended claims.

What is claimed is:

1. A method for implementing spin-torque oscillator (STO) erasure prevention for microwave assisted magnetic recording (MAMR) hard disk drives (HDDs) comprising:
   providing a STO element; said STO element having a field generation layer (FGL) and a spin polarization layer (SPL) and located between a main pole (MP) and a trailing shield (TS);
   applying a first voltage to a STO element at a time of write operation and generating first values of a trailing gap (TG) field between said main pole (MP) and said trailing shield (TS) and field generation layer (FGL) frequency of said STO element; and
   applying a second voltage to a STO element at a time of read operation to prevent erasure resulting from remnant STO magnetization; said second voltage being lower than said first voltage and said second voltage having a different polarity than said first voltage, and generating second values of said trailing gap (TG) field between said main pole (MP) and said trailing shield (TS) and said field generation layer (FGL) frequency; said second values being near zero and substantially less than said first values.

2. The method as recited in claim 1, wherein current through the STO element is lower with the second voltage applied to the STO element at the time of read operation than current through the STO element with the first voltage applied to the STO element at the time of write operation.

3. The method as recited in claim 1, wherein the second voltage applied to the STO element at the time of read operation changes a direction of magnetization in said field generation layer (FGL) of the STO element.

4. An apparatus for implementing spin-torque oscillator (STO) erasure prevention for microwave assisted magnetic recording (MAMR) hard disk drives (HDDs), comprising:
   a controller;
   at least one disk; said disk including a disk media for storing data;
   a spin-torque oscillator (STO) element for microwave assisted magnetic recording (MAMR); said STO element having a field generation layer (FGL) and a spin polarization layer (SPL) and located between a main pole (MP) and a trailing shield (TS);
   said controller applying a first voltage to a STO element at a time of write operation and generating first values of a trailing gap (TG) field between said main pole (MP) and said trailing shield (TS) and field generation layer (FGL) frequency of said STO element; and
   said controller applying a second voltage to a STO element at a time of read operation to prevent erasure resulting from remnant STO magnetization; said second voltage being lower than said first voltage and said second voltage having a different polarity than said first voltage, and generating second values of said trailing gap (TG) field between said main pole (MP) and said trailing shield (TS) and said field generation layer (FGL) frequency; said second values being near zero and substantially less than said first values.

5. The apparatus as recited in claim 4 includes control code stored on a non-transitory computer readable medium, and wherein said controller uses said control code to effectively prevent spin-torque oscillator (STO) erasure.

6. The apparatus as recited in claim 4, wherein current through the STO element is lower with the second voltage applied to the STO element at the time of read operation than current through the STO element with the first voltage applied to the STO element at the time of write operation.

7. The apparatus as recited in claim 4, wherein said controller applying a second voltage to the STO element at the time of read operation changes a direction of magnetization in said field generation layer (FGL) of the STO element.

8. The apparatus as recited in claim 4, wherein said controller applying a second voltage to a STO element at a time of read operation to prevent erasure resulting from remnant STO magnetization includes said controller providing a current flow at the time of read operation in an opposite direction as a current flow at the time of write operation.

9. A system for implementing prevention of spin-torque oscillator (STO) erasure comprising:
   a microwave assisted magnetic recording (MAMR) hard disk drive (HDD), said MAMR HDD comprising a controller;
   at least one disk; said disk including a disk media for storing data;
   a spin-torque oscillator (STO) element for microwave assisted magnetic recording (MAMR); said STO element having a field generation layer (FGL) and a spin polarization layer (SPL) and located between a main pole (MP) and a trailing shield (TS);
   said controller applying a first voltage to a STO element at a time of write operation and generating first values of a trailing gap (TG) field between said main pole (MP) and said trailing shield (TS) and field generation layer (FGL) frequency of said STO element; and said controller applying a second voltage to a STO element at a time of read operation to prevent erasure resulting from remnant STO magnetization; said second voltage being lower than said first voltage and said second voltage having a different polarity than said first voltage, and generating second values of said trailing gap (TG) field between said main pole (MP) and said trailing shield (TS) and said field generation layer (FGL) frequency; said second values being near zero and substantially less than said first values.

10. The system as recited in claim 9 includes control code stored on a non-transitory computer readable medium, and wherein said controller uses said control code to implement prevention of spin-torque oscillator (STO) erasure.

11. The system as recited in claim 9, wherein said controller applying a second voltage to a STO element at a time of read operation to prevent erasure resulting from remnant STO magnetization includes said controller providing a current flow at the time of read operation in an opposite direction as a current flow at the time of write operation.

\* \* \* \* \*